US009033126B2

(12) United States Patent
Strong (10) Patent No.: US 9,033,126 B2
(45) Date of Patent: May 19, 2015

(54) SWITCHABLE BI-DIRECTIONAL WEDGE CLUTCH

(71) Applicant: Schaeffler Technologies AG & Co. KG, Herzogenaurach (DE)

(72) Inventor: Scott Strong, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/049,592

(22) Filed: Oct. 9, 2013

(65) Prior Publication Data

US 2014/0262667 A1    Sep. 18, 2014

Related U.S. Application Data

(60) Provisional application No. 61/782,207, filed on Mar. 14, 2013, provisional application No. 61/805,345, filed on Mar. 26, 2013.

(51) Int. Cl.
| | |
|---|---|
| *F16D 21/02* | (2006.01) |
| *F16D 21/04* | (2006.01) |
| *F16D 21/06* | (2006.01) |
| *F16D 21/00* | (2006.01) |

(52) U.S. Cl.
CPC ....................................... *F16D 21/00* (2013.01)

(58) Field of Classification Search
CPC ...................................................... F16D 21/00
See application file for complete search history.

(56) References Cited

U.S. PATENT DOCUMENTS

| 1,887,635 | A | * | 11/1932 | Gehres et al. | 192/21 |
| 2,057,761 | A | * | 10/1936 | Bolton | 192/54.5 |
| 3,089,574 | A | * | 5/1963 | Howard | 192/48.1 |
| 4,098,380 | A | * | 7/1978 | Thomas | 192/48.5 |
| 4,878,571 | A | * | 11/1989 | Sacher | 192/48.91 |
| 7,753,184 | B2 | * | 7/2010 | Traner | 192/43 |
| 2010/0252384 | A1 | * | 10/2010 | Eisengruber | 192/35 |

* cited by examiner

*Primary Examiner* — Stefanos Karmis
*Assistant Examiner* — Alberto Interian, III
(74) *Attorney, Agent, or Firm* — Simpson & Simpson, PLLC

(57) ABSTRACT

A switchable clutch, including: a first clutch including a first outer race with first and second race plates; a second clutch including a second outer race with third and fourth race plates; an inner hub; and a selector system axially disposed between the first and second clutches, in contact with the first and second outer races, and including a selector plate. For a first operational mode, the selector plate rotates to a first circumferential position to non-rotatably connect the first outer race and the inner hub. For a second operational mode, the selector plate rotates to a second circumferential position to non-rotatably connect the second outer race and the inner hub. For a third operational mode: the selector plate rotates to a third circumferential position and the inner hub is rotatable with respect to the first and second outer races. The first and third plates are axially displaceable.

20 Claims, 9 Drawing Sheets

SWITCHABLE BI-DIRECTIONAL WEDGE CLUTCH

CROSS-REFERENCES TO RELATED APPLICATIONS

This application claims the benefit of U.S. Provisional Patent Application No. 61/782,207, filed Mar. 14, 2013 and U.S. Provisional Patent Application No. 61/805,345 filed Mar. 26, 2013, which applications are incorporated herein by reference in their entirety.

TECHNICAL FIELD

The present disclosure relates to a switchable bi-directional clutch, in particular a clutch switchable between multiple torque paths.

BACKGROUND

Known switchable clutches either use multiple actuators to control multiple torque paths and/or require cessation of rotation of components in torque paths being switched.

SUMMARY

According to aspects illustrated herein, there is provided a switchable clutch, including: a first clutch including a first outer race with first and second race plates; a second clutch including a second outer race with third and fourth race plates; an inner hub; and a selector system axially disposed between the first and second clutches, in contact with the first and second outer races, and including a selector plate. For a first operational mode, the selector plate is arranged to rotate to a first circumferential position to non-rotatably connect the first outer race and the inner hub. For a second operational mode, the selector plate is arranged to rotate to a second circumferential position to non-rotatably connect the second outer race and the inner hub. For a third operational mode: the selector plate is arranged to rotate to a third circumferential position and the inner hub is rotatable with respect to the first and second outer races. The first and third plates are axially displaceable.

According to aspects illustrated herein, there is provided a switchable clutch, including: an inner hub; a first clutch including a first outer race with first and second race plates and first and second wedge plates radially disposed between the first outer race and the inner hub; a second clutch including a second outer race with third and fourth race plates and third and fourth wedge plates radially disposed between the second outer race and the inner hub; and a selector system axially disposed between the first and second clutches, in contact with the first and second outer races, and including a selector plate. For a first operational mode, the selector plate is arranged to rotate to a first circumferential position to axially displace the first race plate toward the second race plate such that the first and second wedge plates non-rotatably engage the first and second race plates, respectively, to non-rotatably connect the first outer race and the inner hub. For a second operational mode, the selector plate is arranged to rotate to a second circumferential position to axially displace the third race plate toward the fourth race plate such that the third and fourth wedge plates non-rotatably engage the third and fourth race plates, respectively, to non-rotatably connect the second outer race and the inner hub. For a third operational mode, the selector plate is arranged to rotate to a third circumferential position such that the inner hub is rotatable with respect to the first and second outer races.

According to aspects illustrated herein, there is provided a switchable clutch, including: a first drive element; a second drive element; an inner hub; a first clutch including a first outer race with a first race plate; a second clutch including a second outer race with a second race plate; and a selector system including a selector plate with first and second pluralities of circumferentially disposed and axially extending ramps; and first and second ramp plates with third and fourth pluralities of circumferentially disposed and axially extending ramps. For a first operational mode, the selector plate is rotatable to a first position such that the inner hub is rotatable with respect to the first and second outer races. For a second operational mode, the selector plate is rotatable in a first rotational direction, from the first position to a second position, such that the first and third pluralities of circumferentially disposed and axially extending ramps contact and rotate with respect to each other to axially displace the first race plate to non-rotatably connect the first outer race with the inner hub. For a third operational mode, the selector plate is rotatable in a second rotational direction, opposite the first rotational direction, from the first position to a third position, such that the second and fourth pluralities of circumferentially disposed and axially extending ramps contact and rotate with respect to each other to axially displace the second race plate to non-rotatably connect the second outer race with the inner hub. For a fourth operational mode, the selector plate is rotatable in the first rotational direction, from the second position, such that the second and fourth pluralities of circumferentially disposed and axially extending ramps contact and rotate with respect to each other to axially displace the second race plate to non-rotatably connect the second outer race with the inner hub and. For a fifth operational mode, the selector plate is rotatable in the second rotational direction, from the third position, such that the first and third pluralities of circumferentially disposed and axially extending ramps contact and rotate with respect to each other to axially displace the first race plate to non-rotatably connect the first outer race with the inner hub.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
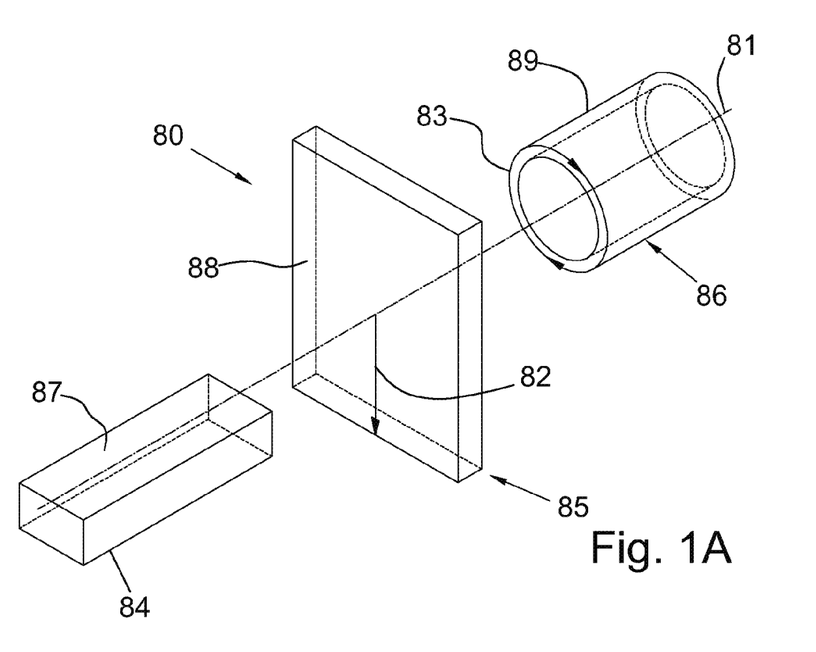
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
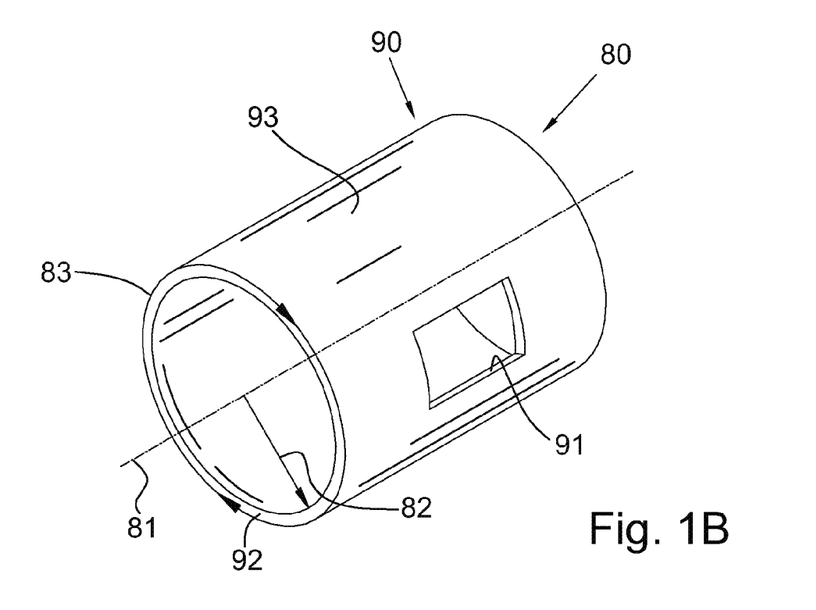
FIG. 1B is a perspective view of an object in the cylindrical coordinate system of FIG. 1A demonstrating spatial terminology used in the present application; and, FIG. 2 is a side view of a switchable clutch.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
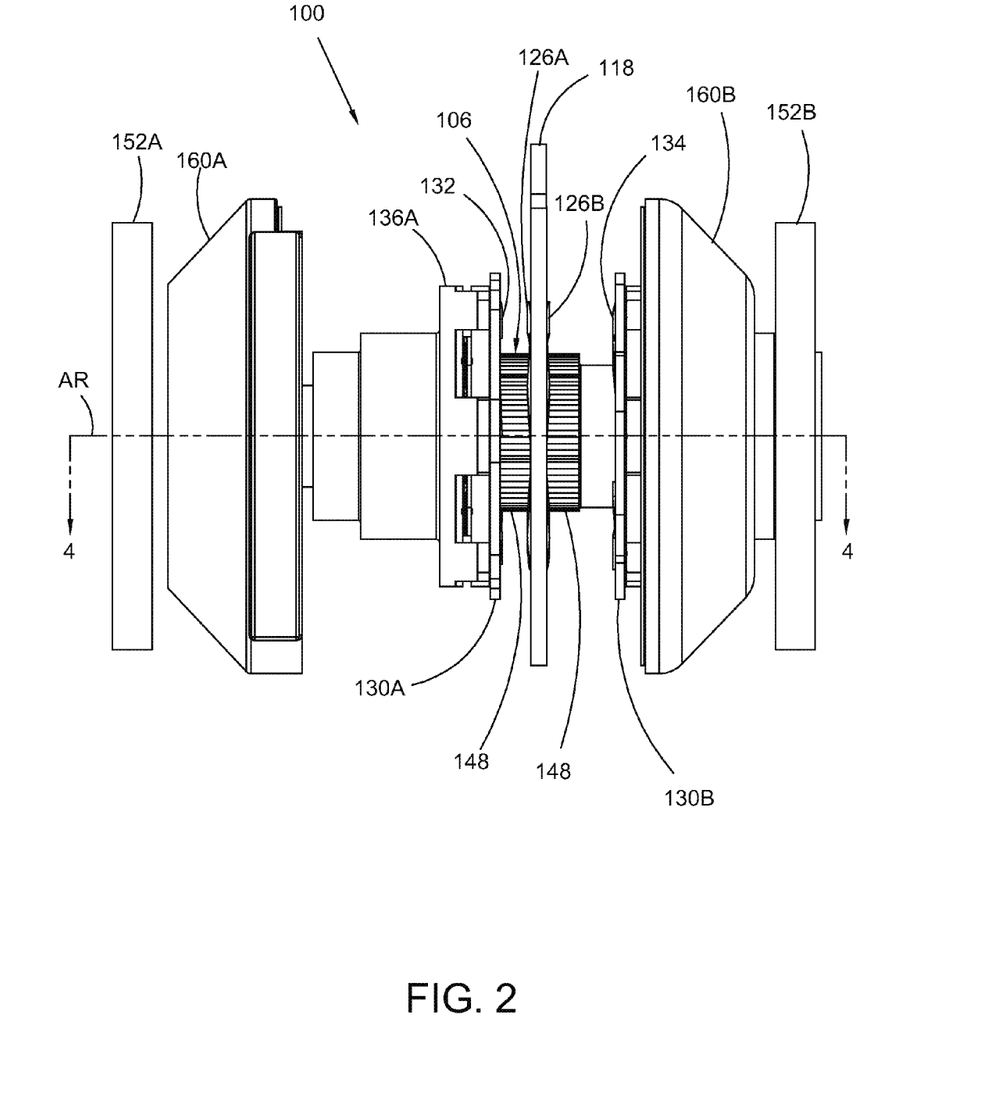

FIG. 2 is a partially exploded side view of switchable bi-directional clutch 100.

Figure 3:
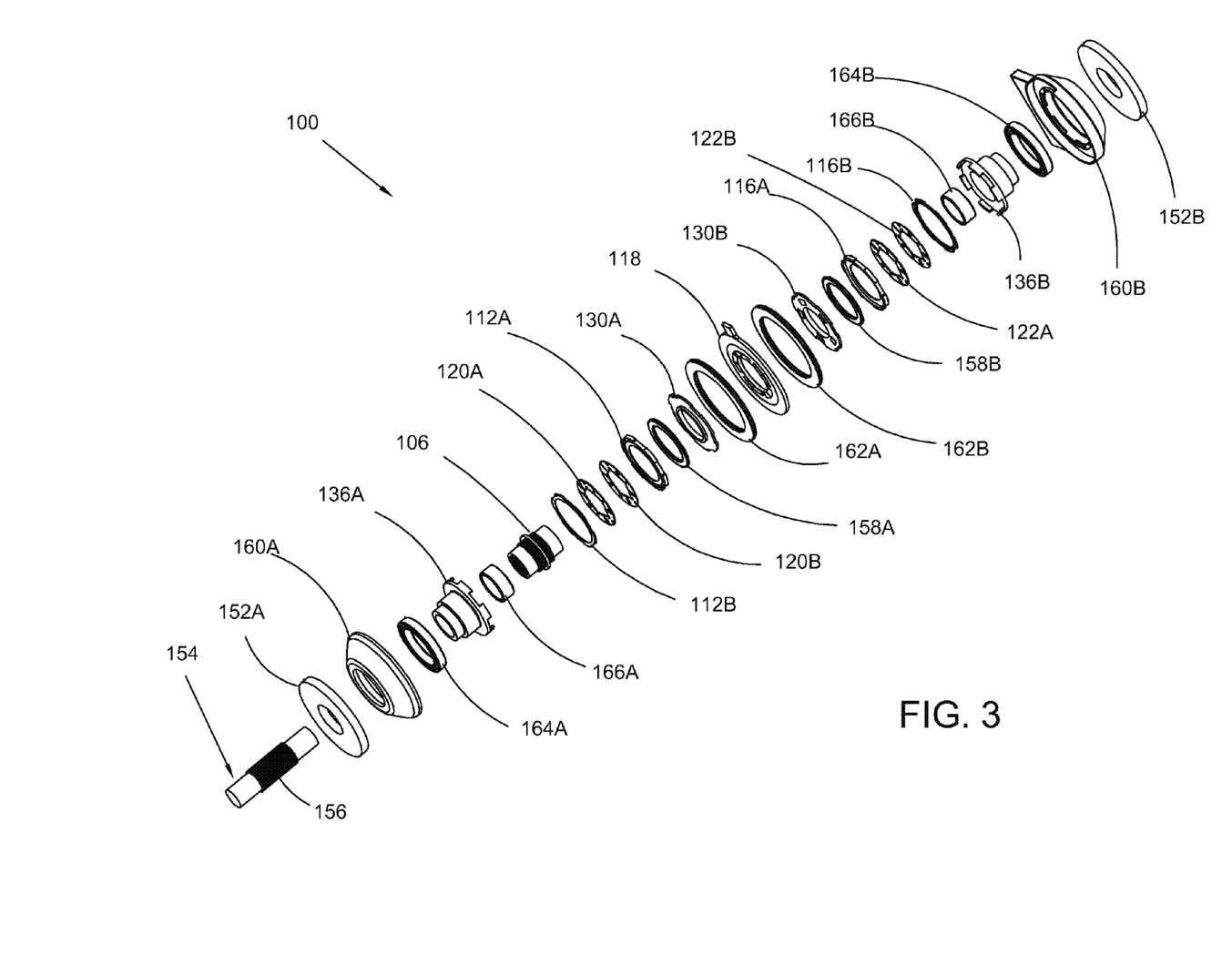
FIG. 3 is an exploded view of the switchable bi-directional clutch of FIG. 2.

FIG. 3 is an exploded view of switchable clutch 100 of FIG. 2.

Figure 4:
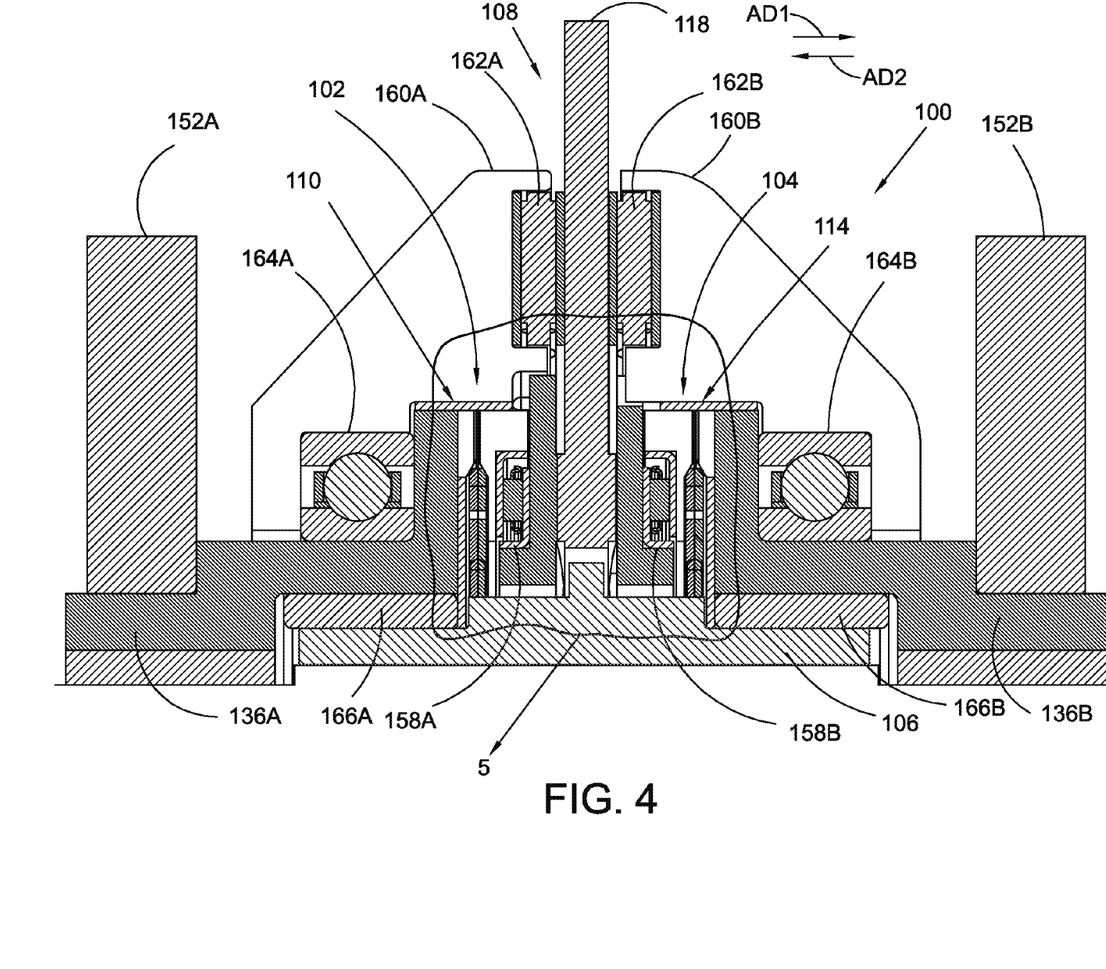
FIG. 4 is a partial cross-sectional view generally along line 4-4 in FIG. 2.

FIG. 4 is a partial cross-sectional view generally along line 4-4 in FIG. 2.

Figure 5:
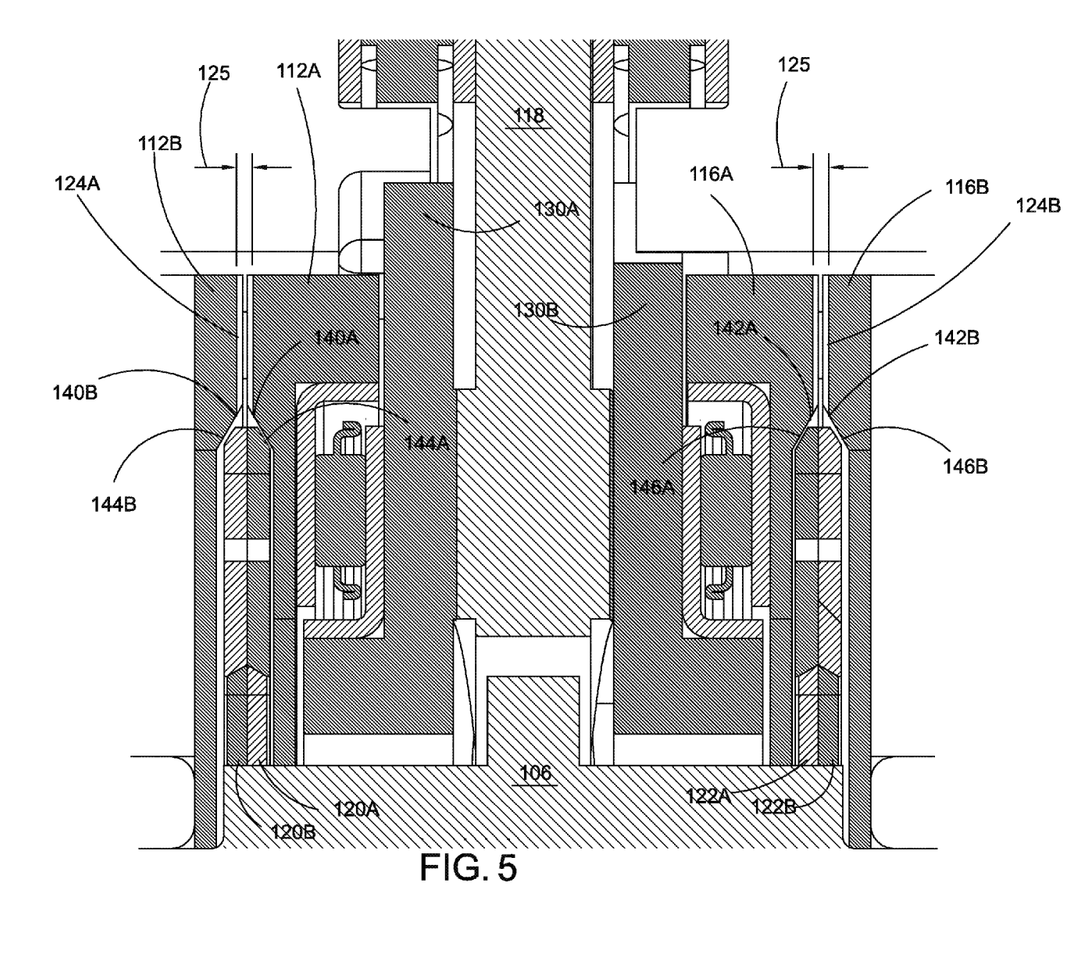
FIG. 5 is a detail of FIG. 4.

FIG. 5 is a detail of FIG. 4. The following should be viewed in light of FIGS. 2 through 5. Switchable clutch 100 includes clutches 102 and 104, inner hub 106, and selector system 108. Clutch 102 includes outer race 110 and race plates 112A and 112B. Clutch 104 includes outer race 114 with race plates 116A and 116B. The selector system is axially disposed between clutches 102 and 104, is in contact with the outer races 110 and 114, and includes selector plate 118.

For a first operational mode, the selector plate is arranged to rotate to a first circumferential position to non-rotatably connect outer race 110 and the inner hub. That is, clutch 102 closes. In the first mode, clutch 104 remains open. For a second operational mode, the selector plate is arranged to rotate to a second circumferential position and outer race 114 and the inner hub are non-rotatably connected. That is, dutch 104 closes. In the second mode, clutch 102 remains open. For a third operational mode (free wheel mode), the selector plate is arranged to rotate to a third circumferential position such that the inner hub is rotatable with respect to outer races 110 and 114. That is, clutches 102 and 104 are open. For fourth and filth operational modes, the selector plate is arranged to rotate to fourth and fifth circumferential positions, respectively, such that the inner hub is non-rotatably connected to outer races 110 and 114, that is each of clutches 102 and 104 is closed.

Clutch 102 includes at least one wedge plate 120 radially disposed between outer race 110 and the inner hub. Clutch 104 includes at least one wedge plate 122 radially disposed between outer race 114 and the inner hub. In the first operational mode, outer race 110, the at least one first wedge plate 120, and the inner hub are non-rotatably connected. In the second operational mode, outer race 114, the at least one wedge plate 122, and the inner hub are non-rotatably connected. In the third operational mode the at least one wedge plate 120 is free of contact with the outer race 110 and the at least one wedge plate 122 is free of contact with outer race 114. In an example embodiment, the at least one wedge plate 120 includes wedge plates 120A and 120B and the at least one wedge plate 122 includes wedge plates 122A and 122B. The discussion that follows is directed toward wedge plates 120A and 120B and wedge plates 122A and 122B; however, it should be understood that the discussion also is applicable to at least one wedge plate 120 and at least one wedge plate 122, unless stated otherwise.

In the first operational mode, the selector plate is arranged to axially displace race plate 112A plate toward race plate 112B such that wedge plates 120A and 120B non-rotatably engage race plates 112A and 112B, respectively, to non-rotatably connect outer race 110 and the inner hub. In the second operational mode, the selector plate is arranged to axially displace race plate 116A toward race plate 116B such that wedge plates 122A and 122B non-rotatably engage race plates 116A and 116B, respectively, to non-rotatably connected outer race 114 and the inner hub.

In an example embodiment, clutch 100 includes resilient elements 124A and 124B. Element 124A is axially disposed between race plates 112A and 112B and urges race plate 112A away from race plate 112B in axial direction AD1. Element 124B is axially disposed between race plates 116A and 116B and urges race plate 116A away from race plate 116B in axial direction AD2, opposite direction AD1. Thus, element 124A maintains gap 125 between plates 112A and 112B to ensure that wedge plates 120A and 120B are free of contact with race plates 112A and 112B, respectively, in the second and third operational modes and element 124B maintains gap 125 between plates 116A and 116B to ensure that wedge plates 122A and 122B are free of contact with race plates 116A and 116B, respectively, in the first and third operational modes.

Figure 6:
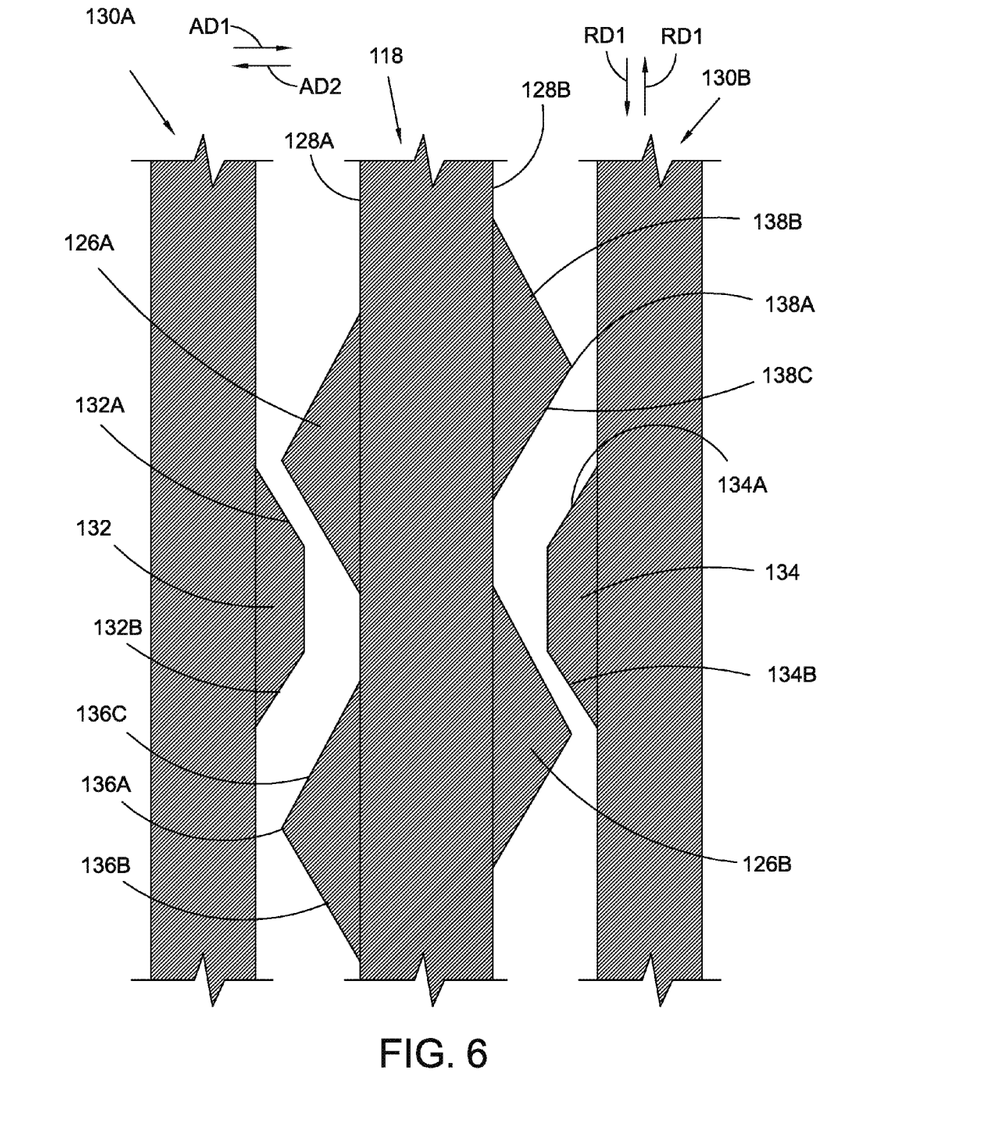
FIG. 6 is a schematic side view of the selector plate and ramps plates from FIG. 2 with capability for all operational modes.

FIGS. 6A and 6B are schematic side views of respective portions of selector plate 118 from FIG. 2.

Figure 7A:
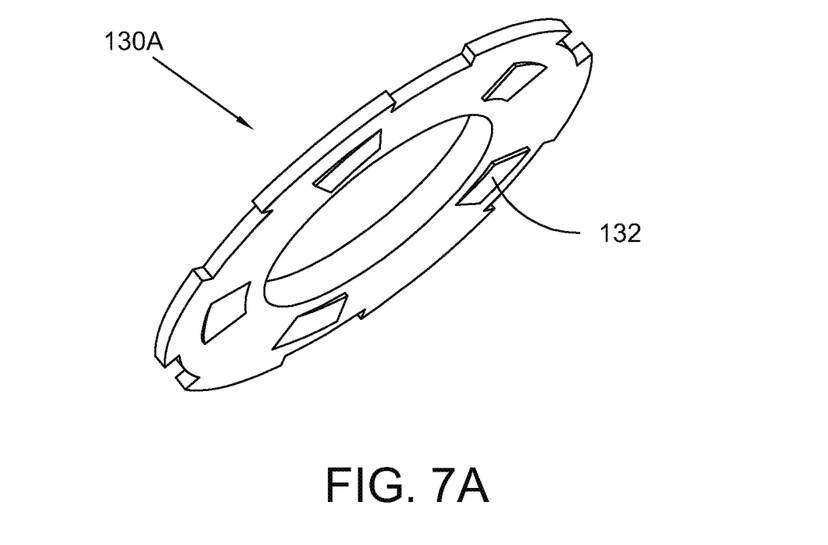
FIGS. 7A and 7B are perspective views of ramp plates from FIG. 2 with capability for a limited number of operational modes.
Figure 7B:
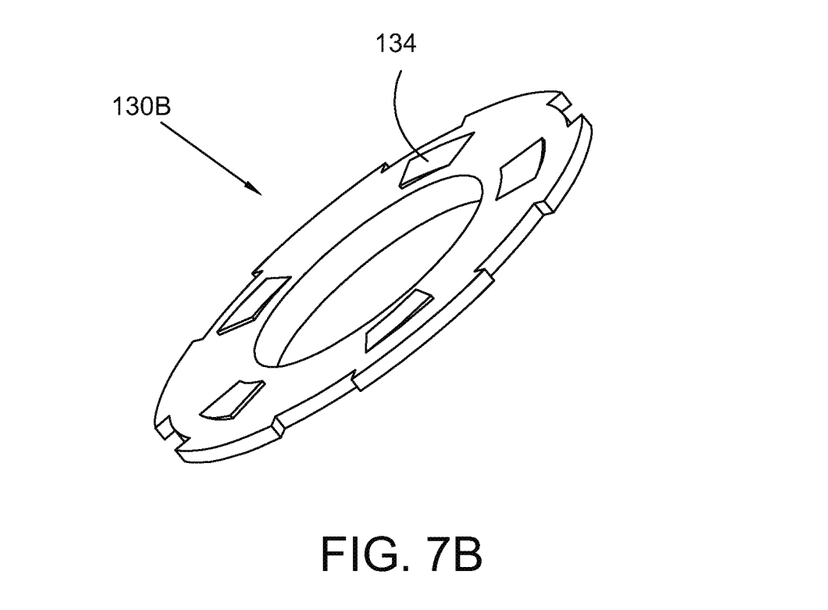

FIGS. 7A and 7B are perspective views of ramp plates from FIG. 2.

Figure 8:
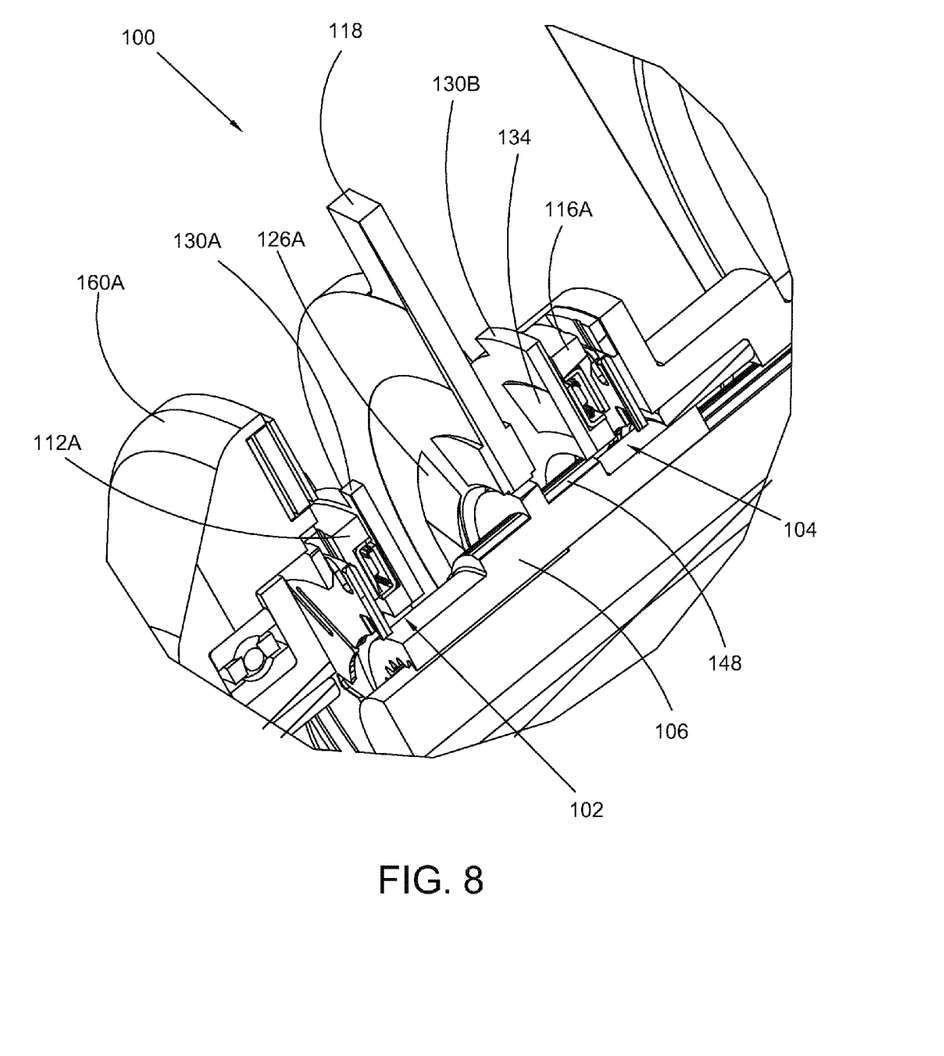
FIG. 8 is a perspective partial cross-sectional and partial exploded view of area 5; and, FIG. 9 is a perspective view of a wedge plate from FIG. 2.

FIG. 8 is a perspective partial cross-sectional and partial exploded view of area 5. The following should be viewed in light of FIGS. 2 through 8. In an example embodiment, the selector plate includes respective pluralities of circumferentially disposed and axially extending ramps 126A and 126B on radially disposed sides 128A and 128B of the selector plate. In an example embodiment, the selector system includes ramp plates 130A and 130B. Plate 130A, shown in FIG. 7A, is axially disposed wedge plate 120A and the selector plate and to includes a plurality of circumferentially disposed and axially extending ramps 132. Plate 130B, shown in FIG. 7B, is axially disposed wedge plate 122A and the selector plate and includes a plurality of circumferentially disposed and axially extending ramps 134.

For the first operational mode, ramps 126A are arranged to rotationally engage ramps 132 to axially displace ramp plate 130A and race plate 112A in axial direction AD1 while the race plate 112B remains axially fixed. For the second operational mode, ramps 126B are arranged to rotationally engage ramps 134 to axially displace ramp plate 130B and race plate 116A in axial direction AD2 while race plate 116B remains axially fixed.

In an example embodiment, to transit from the third operational mode to the first operational mode, the selector switch is arranged to rotate in rotational direction RD1, and to transit from the first operational mode to the fourth operational mode the selector switch is arranged to rotate further in rotational direction RD1 such that ramps 126B engage ramps 134 to axially displace ramp plate 130B and race plate 116A in the axial direction AD2. In an example embodiment, to transit from the third operational mode to the second operational mode, the selector switch is arranged to rotate in rotational direction RD2, opposite RD1, and to transit from the second operational mode to the fifth operational mode the selector switch is arranged to rotate further in rotational direction RD2 such that ramps 126A engage ramps 132 to axially displace ramp plate 130A and race plate 112A in axial direction AD1.

In an example embodiment, each ramp 126A includes respective center point 136A extending furthest in axial direction AD2, respective portion 136B extending from the center point in rotational direction RD1 and sloping in axial direction AD1, and respective portion 136C extending from the center point in rotational direction RD2 and sloping in axial direction AD1. Respective portions 136B engage ramps 132 in the first operational mode, and respective portions 136C engage ramps 132 in the fourth operational mode.

In an example embodiment, each ramp 126B includes respective center point 138A extending furthest in axial direction AD1, respective portion 138B extending from the center point in rotational direction RD2 and sloping in axial direction AD2, and respective portion 138C extending from the center point in rotational direction RD1 and sloping in axial direction AD2. Respective portions 138B engage ramps 134 in the second operational mode, and respective portions 138C engage ramps 134 in the fifth operational mode.

In an example embodiment, race plates 112A and 112B include radially inner circumferential surfaces 140A and 140B, respectively, tapering radially outward and toward each other to form an inner chamfer, and race plates 116A and 116B include radially inner circumferential surfaces 142A and 142B, respectively, tapering radially outward and toward each other to form an inner chamfer. In an example embodiment, wedge plates 120A and 120B include radially outer circumferential surfaces 144A and 144B, respectively, tapering radially outward and toward each other to form an outer chamfer. In an example embodiment, wedge plates 122A and 122B include radially outer circumferential surfaces 146A and 146B, respectively, tapering radially outward and toward each other to form an outer chamfer.

For the first operational mode, surfaces 140A and 140B non-rotatably engage surfaces 144A and 144B, respectively. For the second operational mode, surfaces 142A and 142B non-rotatably engage surfaces 146A and 146B, respectively. For the third operational mode, surfaces 140A and 140B are free of contact with suraces 144A and 144B, respectively, and surfaces 142A and 142B are free of contact with surfaces 146A and 146B, respectively. Further detail applicable to the operation of race plates 112A and 112B with respect to wedge plates wedge plates 120A and 120B, and race plates 116A and 116B with respect to wedge plates wedge plates 122A and 122B are presented in commonly owned U.S. Provisional Patent Application No. 61/715,518, which application is incorporated herein in its entirety.

Figure 9:
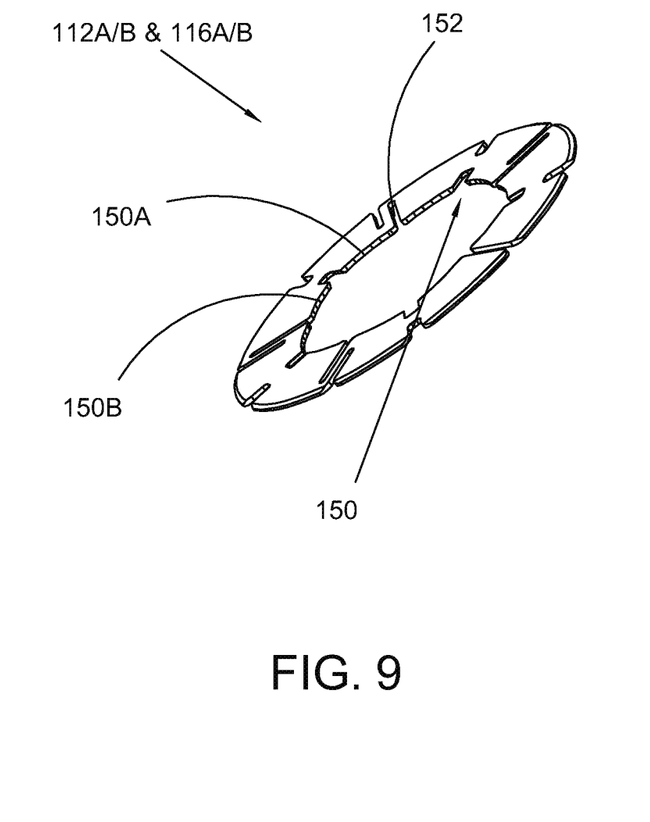

FIG. 9 is a perspective view of a wedge plate from FIG. 2. The following should be viewed in light of FIGS. 2 through 8. In an example embodiment, the inner huh includes pluralities of ramps 148; wedge plates 120A, 120B, 122A, and 122B include pluralities of ramps 150. The orientation for wedge plates 112B and 116A are shown in FIG. 8; however, it should be understood that the same plate can be used for wedge plates 112A and 116B by flipping the plate about axis of rotation AR for clutch 100. Each ramp 150 includes respective portions 150A and 150B separated by respective slots 152. Portions 150A and 150B slope radially inward toward each other. Each ramp 150 is mated with a respective ramp 148 on the inner hub, which mirrors the configuration of the ramp 150.

For the first and fourth operational modes, the non-rotatable connection of surfaces 140A and 140B with surfaces 144A and 144B, respectively, causes wedge plates 120A and 120B to rotate with respect to the inner hub such that ramps 148 and 150 slide across each other, displacing wedge plates 120A and 120B radially outward to non-rotatably connect with the inner hub and outer race 110. For the second and fifth operational modes, the non-rotatable connection of surfaces 142A and 142B with surfaces 146A and 146B, respectively, causes wedge plates 122A and 122B to rotate with respect to the inner hub such that ramps 148 and 150 slide across each other, displacing wedge plates 122A and 122B radially outward to non-rotatably connect with the inner hub and outer race 114.

In an example embodiment, clutch 100 includes drive elements 152A and 152B. Element 152A is non-rotatably connected to clutch 102, for example by hub 136A non-rotatably connected to plate 112B. Element 152B is non-rotatably connected to clutch 104, for example by hub 136B non-rotatably connected to plate 116B. Element 152A is arranged to transmit torque to or from clutch 102 as further described below. Element 152B is arranged to transmit torque to or from clutch 104 as further described below. In an example embodiment, clutch 100 includes shaft 154 non-rotatably connected to the inner hub, for example by spline connection 156.

In an example embodiment, clutch 100 includes the following components. A multi-position selector switch (not shown) is used to rotate selector plate 118. In general, plate 118 can be rotated by any means known in the art. Bearings 158A and 158B are axially located between ramp plates 130A and 130B and wedge plates 112A and 116A, respectively, transfer axial motion and load from ramp plates 130A and 130B to outer races 110 and 114, respectively, and enable relative motion between the ramp plates 130A and 130B and race plates 112A and 116A, respectively. Housings 160A and 160B enclose the majority of clutch 100 components, including clutches 102 and 104, the inner hub, and portions of the selector system. Housing 160A locates bearing 164A, ramp plate 130A, and bearing 162A. Housing 160B locates bearing 164B, ramp plate 130B, and bearing 162B. Bearings 162A and 162B are axially located between housings 160A and 160B and selector plate 118, guide the selector plate during rotation, and supply axial support during engagement and/or torque transmission. Radial/axial load bearings 164A and 164B center and support drive hubs 136A and 136B, respectively, to housings 160A and 160B, respectively, and enable relative rotation of drive hubs 136A and 136B with respect to housings 160A and 160B, respectively. Hub bushings 166A and 166B center the inner hub to drive hubs 136A and 136B, respectively, and enable relative rotation between the inner hub and drive hubs 136A and 136B.

The following provides further detail regarding clutch 100. Drive hubs 136A and 136B are fixed to outer races 110 and 114, respectively, center bushings 166A and 166B, respectively, are centered/located by bearings 164A and 164B, respectively, and are non-rotatably connected to drive elements 152A and 152B, respectively.

In an example embodiment, at least one of the inner hub or outer race 110 is rotatable during a portion of the rotation of the selector plate from the first circumferential position to the second circumferential position. In an example embodiment, at least one of the inner hub or outer race 114 is rotatable during a portion of the rotation of the selector plate from the second circumferential position to the first circumferential position.

Bi-directional wedge clutches 102 and 104 in clutch 100 enable switching between multiple torque paths or a free wheel mode (the third mode of operation). The inner hub and drive elements 152A and 152B can be torque inputs or a torque outputs, depending on the selected mode of operation. The free wheel mode is activated when clutches 102 and 104 are each open. The following are possible torque paths through clutch 100:

1. In the first operational mode, a first torque path is through drive element 152A to shaft 154.
2. in the first operational mode, a second torque path is through shaft 154 to drive element 152A.
3. In the second operational mode, a third torque path is through drive element 152B to shaft 154.
4. In the second operational mode, a fourth torque path is through shaft 154 to drive element 152B,
5. In the fourth and fifth operational mode, a fifth torque path is through shaft 154 drive elements 152A and 152B.
6. In the fourth and fifth operational modes, a sixth torque path is through drive element 152A to shaft 154 and drive element 152B.
7. In the fourth and fifth operational modes, a seventh torque path is through drive element 152B to shaft 154 and drive element 152A.
8. In the fourth and fifth operational modes, an eighth torque path is through drive elements 152A and 152B to shaft 154.

The design of the ramp interface between selector plate 118 and ramp plates 130A and 130B (ramps 126A, 126B, 132, and 134) enables one of two options. The first option requires the selector plate to be held in a particular position to maintain a particular operational mode, for example, to keep one or both of clutches 102 and 104 open or closed. A load on the clutch is then removed to enable a switch to a different operating mode. The free wheel mode is the default operating mode for this option. The second option enables the selection of an operating mode to be made and locked in position. A load is then needed to open the clutch. The angle of ramp interfaces and coefficients of friction between engaged ramps are used in the second option to calculate self locking angles for the ramps based on respective coefficients of friction. In second option, there is no default operating mode internal; instead each operating mode is controlled by operation of the selector plate.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A switchable clutch, comprising:
   a first clutch including a first outer race with first and second race plates;
   a second clutch including a second outer race with third and fourth race plates;
   an inner hub; and,
   a selector system including a selector plate axially disposed between the first and second clutches and in contact with the first and second outer races wherein:
      for a first operational mode, the selector plate is arranged to rotate to a first circumferential position to non-rotatably connect the first outer race and the inner hub;
      for a second operational mode, the selector plate is arranged to rotate to a second circumferential position to non-rotatably connect the second outer race and the inner hub; and,
      for a third operational mode:
         the selector plate is arranged to rotate to a third circumferential position; and,
         the inner hub is rotatable with respect to the first and second outer races, wherein:
      the first and third race plates are axially displaceable.

2. The switchable clutch of claim 1, wherein for a fourth operational mode:
   the selector plate is arranged to rotate to a fourth or fifth circumferential position;
   the first outer race and the inner hub are non-rotatably connected; and,
   the second outer race and the inner hub are non-rotatably connected.

3. The switchable clutch of claim 1, wherein:
   at least one of the inner hub or the first outer race is arranged to rotate during a portion of the rotation of the selector plate from the first circumferential position to the second circumferential position; or,
   at least one of the inner hub or the second outer race is arranged to rotate during a portion of the rotation of the selector plate from the second circumferential position to the first circumferential position.

4. The switchable clutch of claim 1, wherein:
   the first clutch includes at least one first wedge plate radially disposed between the first outer race and the inner hub;
   the second clutch includes at least one second wedge plate radially disposed between the second outer race and the inner hub;
   in the first operational mode, the first outer race, the at least one first wedge plate, and the inner hub are non-rotatably connected;
   in the second operational mode, the second outer race, the at least one second wedge plate, and the inner hub are non-rotatably connected; and, in the third operational mode:
the at least one first wedge plate is free of contact with the first outer race; and,
the at least one second wedge plate is free of contact with the second outer race.

5. The switchable clutch of claim 4, wherein:
in the first operational mode, the selector plate is arranged to axially displace the first race plate toward the second race plate such that the at least one first wedge plate non-rotatably engages the first and second race plates, respectively; and,
in the second operational mode, the selector plate is arranged to axially displace the third race plate toward the fourth race plate such that the at least one second wedge plate non-rotatably engages the third and fourth race plates, respectively.

6. The switchable clutch of claim 1, further comprising:
a first resilient element axially disposed between the first and second race plates and urging the first race plate away from the second race plate in a first axial direction; and,
a second resilient element axially disposed between the third and fourth race plates and urging the third race plate away from the fourth race plate in a second axial direction, opposite the first axial direction.

7. A switchable clutch, comprising:
an axis of rotation;
an inner hub;
a first clutch including:
 a first outer race with first and second race plates; and,
 first and second wedge plates radially disposed between the first outer race and the inner hub;
a second clutch including:
 a second outer race with third and fourth race plates; and,
 third and fourth wedge plates radially disposed between the second outer race and the inner hub; and,
a selector system axially disposed between the first and second clutches, in contact with the first and second outer races, and including a selector plate, wherein:
 the inner hub, the first clutch, the second clutch, and the selector plate are each rotatable about the axis of rotation;
 for a first operational mode, the selector plate is arranged to rotate to a first circumferential position to axially displace the first race plate toward the second race plate such that the first and second wedge plates non-rotatably engage the first and second race plates, respectively, to non-rotatably connect the first outer race and the inner hub;
 for a second operational mode, the selector plate is arranged to rotate to a second circumferential position to axially displace the third race plate toward the fourth race plate such that the third and fourth wedge plates non-rotatably engage the third and fourth race plates, respectively, to non-rotatably connect the second outer race and the inner hub; and,
 for a third operational mode, the selector plate is arranged to rotate to a third circumferential position such that the inner hub is rotatable with respect to the first and second outer races.

8. The switchable clutch of claim 7, wherein for a fourth operational mode:
the selector plate is arranged to rotate to a fourth or fifth circumferential position;
the first outer race and the inner hub are non-rotatably connected; and,
the second outer race and the inner hub are non-rotatably connected.

9. The switchable clutch of claim 7, wherein:
at least one of the inner hub or the first outer race is arranged to rotate during a portion of the rotation of the selector plate from the first circumferential position to the second circumferential position; or,
at least one of the inner hub or the second outer race is arranged to rotate during a portion of the rotation of the selector plate from the second circumferential position to the first circumferential position.

10. The switchable clutch of claim 7, wherein:
the selector plate includes first and second pluralities of circumferentially disposed and axially extending ramps;
the selector system includes:
 a first ramp plate axially disposed between the first wedge plate and the selector plate and including a third plurality of circumferentially disposed and axially extending ramps; and,
 a second ramp plate axially disposed between the third wedge plate and the selector plate and including a fourth plurality of circumferentially disposed and axially extending ramps;
for the first operational mode, the first plurality of ramps is arranged to engage the third plurality of ramps to axially displace the first ramp plate and the first race plate in a first axial direction while the second race plate remains axially fixed; and,
for the second operational mode, the second plurality of ramps is arranged to engage the fourth plurality of ramps to axially displace the second ramp plate and the third race plate in a second axial direction, opposite the first axial direction, while the fourth race plate remains axially fixed.

11. The switchable clutch of claim 10, further comprising:
a selector switch, wherein:
for a fourth operational mode the inner hub is non-rotatably connected to the first and second outer races;
to transit from the third operational mode to the first operational mode, the selector switch is arranged to rotate in a first rotational direction; and,
to transit from the first operational mode to the fourth operational mode the selector switch is arranged to rotate further in the first rotational direction such that the second plurality of ramps engages the fourth plurality of ramps to axially displace the second ramp plate and the third race plate in the second axial direction.

12. The switchable clutch of claim 10, further comprising:
a selector switch, wherein:
for a fourth operational mode the inner hub is non-rotatably connected to the first and second outer races;
to transit from the third operational mode to the second operational mode, the selector switch is arranged to rotate in a first rotational direction; and,
to transit from the second operational mode to the fourth operational mode the selector switch is arranged to rotate further in the first rotational direction such that the first plurality of ramps engages the third plurality of ramps to axially displace the first ramp plate and the first race plate in the first axial direction.

13. The switchable clutch of claim 10, wherein:
each ramp in the first plurality of circumferentially disposed and axially extending ramps includes:
 a respective center point forming a respective portion of said each ramp extending furthest in the first axial direction;

a respective first portion extending from the center point in a first rotational direction and sloping in the second axial direction; and, a respective second portion extending from the center point in a second rotational direction, opposite the first rotational direction, and sloping in the second axial direction;

the respective first portions engage the third plurality of ramps in the first operational mode; and, the respective second portions engage the third plurality of ramps in a fourth operational mode.

14. The switchable clutch of claim 10, wherein:

each ramp in the second plurality of circumferentially disposed and axially extending ramps includes:

a respective center point forming a respective portion of said each ramp extending furthest in the second axial direction;

a respective first portion extending from the center point in a first rotational direction and sloping in the first axial direction; and, a respective second portion extending from the center point in a second rotational direction, opposite the first rotational direction, and sloping in the first axial direction;

the respective first portions engage the fourth plurality of ramps in the first operational mode; and, the respective second portions engage the fourth plurality of ramps in the second operational mode.

15. The switchable clutch of claim 7, further comprising:

a first drive element non-rotatably connected to the first clutch; and, a second drive element non-rotatably connected to the second clutch, wherein:

the first drive element is arranged to transmit first torque to the first clutch or receive first torque from the first clutch; and, the second drive element is arranged to transmit second torque to the second clutch or receive second torque from the second clutch.

16. The switchable clutch of claim 7, further comprising: a shaft non-rotatably connected to the inner hub and arranged to transmit torque to the inner hub or receive torque from the inner hub.

17. The switchable clutch of claim 7, further comprising: a first resilient element axially disposed between the first and second race plates and urging the first race plate away from the second race plate in a first axial direction; and, a second resilient element axially disposed between the third and fourth race plates and urging the third race plate away from the fourth race plate in a second axial direction, opposite the first axial direction.

18. A switchable clutch, comprising:

a first drive element;

a second drive element;

an inner hub;

a first clutch including a first outer race with a first race plate;

a second clutch including a second outer race with a second race plate; and, a selector system including:

a selector plate with first and second pluralities of circumferentially disposed and axially extending ramps; and, first and second ramp plates with third and fourth pluralities of circumferentially disposed and axially extending ramps, wherein:

for a first operational mode, the selector plate is rotatable to a first position such that the inner hub is rotatable with respect to the first and second outer races;

for a second operational mode, the selector plate is rotatable in a first rotational direction, from the first position to a second position, such that the first and third pluralities of circumferentially disposed and axially extending ramps contact and rotate with respect to each other to axially displace the first race plate to non-rotatably connect the first outer race with the inner hub;

for a third operational mode, the selector plate is rotatable in a second rotational direction, opposite the first rotational direction, from the first position to a third position, such that the second and fourth pluralities of circumferentially disposed and axially extending ramps contact and rotate with respect to each other to axially displace the second race plate to non-rotatably connect the second outer race with the inner hub;

for a fourth operational mode, the selector plate is rotatable in the first rotational direction, from the second position, such that the second and fourth pluralities of circumferentially disposed and axially extending ramps contact and rotate with respect to each other to axially displace the second race plate to non-rotatably connect the second outer race with the inner hub; and, for a fifth operational mode, the selector plate is rotatable in the second rotational direction, from the third position, such that the first and third pluralities of circumferentially disposed and axially extending ramps contact and rotate with respect to each other to axially displace the first race plate to non-rotatably connect the first outer race with the inner hub.

19. The switchable clutch of claim 18, wherein:

each ramp in the first plurality of circumferentially disposed and axially extending ramps includes:

a respective center point forming a respective portion of said each ramp extending furthest in the first axial direction;

a respective first portion extending from the center point in a first rotational direction and sloping in the second axial direction; and, a respective second portion extending from the center point in a second rotational direction, opposite the first rotational direction, and sloping in the second axial direction;

the respective first portions engage the third plurality of ramps in the second operational mode; and, the respective second portions engage the third plurality of ramps in the fourth operational mode.

20. The switchable clutch of claim 18, wherein:

each ramp in the second plurality of circumferentially disposed and axially extending ramps includes:

a respective center point forming a respective portion of said each ramp extending furthest in the second axial direction;

a respective first portion extending from the center point in a first rotational direction and sloping in the first axial direction; and, a respective second portion extending from the center point in a second rotational direction, opposite the first rotational direction, and sloping in the first axial direction;

the respective second portions engage the fourth plurality of ramps in the third operational mode; and, the respective second portions engage the fourth plurality of ramps in the fifth operational mode.

* * * * *